(12) United States Patent
Ukitsu et al.

(10) Patent No.: US 11,448,559 B2
(45) Date of Patent: Sep. 20, 2022

(54) CAPACITANCE DETECTION DEVICE FOR DETECTING THE CAPACITANCE OF A SENSOR ELEMENT

(71) Applicant: Panasonic Intellectual Property Management Co., Ltd., Osaka (JP)

(72) Inventors: Hironobu Ukitsu, Osaka (JP); Yuta Moriura, Osaka (JP); Hiroyuki Furuya, Osaka (JP); Takashi Matsumoto, Osaka (JP); Yui Sawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 122 days.

(21) Appl. No.: 17/043,500

(22) PCT Filed: Jan. 17, 2019

(86) PCT No.: PCT/JP2019/001225
§ 371 (c)(1),
(2) Date: Sep. 29, 2020

(87) PCT Pub. No.: WO2019/187515
PCT Pub. Date: Oct. 3, 2019

(65) Prior Publication Data
US 2021/0318186 A1    Oct. 14, 2021

(30) Foreign Application Priority Data
Mar. 30, 2018   (JP) .............................. JP2018-069329

(51) Int. Cl.
*G01L 1/14*    (2006.01)
(52) U.S. Cl.
CPC ..................................... *G01L 1/14* (2013.01)

(58) Field of Classification Search
CPC ........ G01L 1/146; G01L 1/14–148; H01G 2/22
See application file for complete search history.

(56) References Cited

U.S. PATENT DOCUMENTS 4,176,555 A * 12/1979 Dorman ................. G08C 19/10
                                                                    73/1.79
4,621,227 A * 11/1986 Venema ............. G01R 27/2605
                                                                    324/678

(Continued)

FOREIGN PATENT DOCUMENTS

JP    H0943078 A    2/1997
JP    2000258272 A    9/2000

(Continued)

OTHER PUBLICATIONS

Notification of the First Office Action and Search Report issued Chinese Patent Application No. 201980014433.3, dated Nov. 1, 2021; with English translation.

(Continued)

*Primary Examiner* — Tran M. Tran
(74) *Attorney, Agent, or Firm* — McDermott Will & Emery LLP

(57) ABSTRACT

A capacitance detection device includes a sensor unit including at least one sensor element whose capacitance changes, a control line applying to the sensor element a predetermined charging voltage for detecting the capacitance of the sensor element, a shield line electrically shielding the control line, a control circuit supplying the charging voltage to the sensor element via the control line, measuring a voltage change of the sensor element when the charging voltage is applied to the sensor element, and detecting the capacitance of the sensor element based on the voltage change, and an equipotential circuit setting a potential of the shield line equal to a potential of the control line.

5 Claims, 13 Drawing Sheets

(56) References Cited

U.S. PATENT DOCUMENTS

| | | | | |
|---|---|---|---|---|
| 4,644,801 A * | 2/1987 | Kustanovich | ........... | G01L 1/146 73/862.626 |
| 4,985,672 A * | 1/1991 | Hashimoto | ........ | G01R 31/3004 324/73.1 |
| 5,164,663 A * | 11/1992 | Alcorn | ............. | G01R 31/31924 327/309 |
| 5,373,245 A * | 12/1994 | Vranish | ................ | H03K 17/955 324/662 |
| 5,469,070 A * | 11/1995 | Koluvek | ................ | G01R 27/14 324/425 |
| 5,489,888 A * | 2/1996 | Jagiella | .................... | G01D 3/08 340/687 |
| 5,539,292 A * | 7/1996 | Vranish | ................. | B25J 9/1612 901/35 |
| 5,701,101 A * | 12/1997 | Weinhardt | ............... | G01D 5/24 327/345 |
| 6,242,927 B1 * | 6/2001 | Adams | ................. | G01N 27/223 324/663 |
| 6,326,795 B1 * | 12/2001 | Matsumoto | .............. | G01D 5/24 324/669 |
| 6,331,780 B1 * | 12/2001 | Hiroshima | ......... | G01R 27/2605 324/683 |
| 6,335,642 B1 * | 1/2002 | Hiroshima | ......... | G01R 27/2605 327/102 |
| 6,486,681 B1 * | 11/2002 | Weber | ..................... | G01S 13/04 324/688 |
| 6,489,784 B2 * | 12/2002 | Adams | ............... | A01D 41/1277 324/663 |
| 6,756,790 B2 * | 6/2004 | Yakabe | .................. | G01R 27/02 324/684 |
| 6,791,314 B1 * | 9/2004 | Bortolussi | ............ | G01R 31/343 324/126 |
| 6,940,292 B2 * | 9/2005 | Laila | ........................ | G01D 5/24 324/661 |
| 7,005,865 B2 * | 2/2006 | Yakabe | .................. | G01R 27/26 324/76.79 |
| 7,023,223 B2 * | 4/2006 | Yakabe | .................. | G01D 5/24 324/686 |
| 7,088,112 B2 * | 8/2006 | Yakabe | ................ | G01N 27/228 324/686 |
| 7,119,547 B2 * | 10/2006 | Matsuura | ................ | H03F 1/342 324/754.08 |
| 7,898,217 B2 * | 3/2011 | Nate | ......................... | H02J 7/00 320/135 |
| 8,164,354 B2 * | 4/2012 | Lenz | .................... | H03K 17/955 324/687 |
| 8,688,393 B2 * | 4/2014 | Wu | ..................... | G01R 27/2605 463/16 |
| 8,922,223 B2 * | 12/2014 | Suzuki | .................... | G01R 31/64 327/261 |
| 9,400,195 B2 * | 7/2016 | Verburg | ................ | G03F 9/7053 |
| 9,618,367 B2 * | 4/2017 | Seong | ...................... | G01D 5/24 |
| 9,644,995 B2 * | 5/2017 | Verburg | ................... | G01D 5/24 |
| 9,964,579 B2 * | 5/2018 | Igarashi | ............... | G01R 19/165 |
| 10,267,700 B2 * | 4/2019 | Tei | .......................... | G01L 19/04 |
| 10,969,248 B2 * | 4/2021 | Lakatos | ................ | B60K 37/06 |
| 11,029,795 B2 * | 6/2021 | Moyal | ................... | G06F 3/0446 |
| RE48,901 E * | 1/2022 | Verburg | ................ | G03F 9/7053 |
| 2004/0191935 A1 * | 9/2004 | Tinnemans | ........... | G03F 7/7085 438/17 |
| 2006/0033507 A1 | 2/2006 | Gaumel et al. | | |
| 2008/0122454 A1 * | 5/2008 | Kato | ...................... | G01D 3/032 324/661 |
| 2010/0071459 A1 | 3/2010 | Kamm et al. | | |
| 2010/0283539 A1 * | 11/2010 | Yanagisawa | ....... | G01R 19/2503 330/127 |
| 2011/0273192 A1 * | 11/2011 | Huang | .................... | G06F 3/044 324/678 |
| 2013/0057302 A1 * | 3/2013 | Slezak | ..................... | G01D 5/24 324/681 |
| 2017/0191854 A1 * | 7/2017 | Hemes | ..................... | G01D 5/24 |

FOREIGN PATENT DOCUMENTS

| | | |
|---|---|---|
| JP | 2006-518033 A | 8/2006 |
| JP | 5326042 B2 | 10/2013 |

OTHER PUBLICATIONS

International Search Report dated Apr. 2, 2019 in International Application No. PCT/JP2019/001225.

International Preliminary Report on Patentability issued in International Patent Application No. PCT/JP2019/001225, dated Oct. 15, 2020; with English translation.

Notice of Reasons for Refusal dated Mar. 29, 2022 issued in the corresponding Japanese Patent Application No. 2020-509700, with English machine translation.

* cited by examiner

CAPACITANCE DETECTION DEVICE FOR DETECTING THE CAPACITANCE OF A SENSOR ELEMENT

CROSS REFERENCE TO RELATED APPLICATIONS

This application is the U.S. National Phase under 35 U.S.C. § 371 of International Application No. PCT/JP2019/001225, filed on Jan. 17, 2019, which in turn claims the benefit of Japanese Application No. 2018-069329, filed on Mar. 30, 2018, the entire contents of each are hereby incorporated by reference.

TECHNICAL FIELD

The present disclosure relates to a capacitance detection device detecting a capacitance of a sensor element.

BACKGROUND ART

Patent Document 1 discloses a capacitive sensor device capable of measuring a capacitance of a capacitive sensor. This capacitive sensor device includes: a capacitive sensor including first and second electrodes disposed to face each other at a distance and having a capacitance between the first and second electrodes which changes due to application of an external force, or approach or contact of an operator; a voltage applying means connected in series to the first electrode of the capacitive sensor and applying a periodic rectangular wave voltage to the capacitive sensor; a rectifier connected to the second electrode of the capacitive sensor and rectifying electric charges that are charged to and discharged from the capacitive sensor when the voltage applying means applies a periodic rectangular wave voltage; a smoothing capacitor connected in parallel to the rectifier; a shunt resistor for current measurement connected in parallel to the smoothing capacitor; and a voltage measuring means measuring a voltage across the shunt resistor for current measurement.

PATENT DOCUMENT

Patent Document 1: Japanese Patent gazette No. 5326042

SUMMARY

Technical Problem

In the capacitive sensor device described above, the capacitive sensor and the voltage applying means or the voltage measuring means are connected by a control line. This control line may receive a noise signal from the outside and measurement accuracy may be reduced. In particular, when the capacitive sensor and the voltage applying means or the voltage measuring means are arranged apart from each other, the control line becomes long and easily receives the noise signal from the outside, so that the measurement accuracy tends to deteriorate.

To solve the problem described above, an object of the present disclosure is to provide a capacitance detection device capable of accurately measuring a change in capacitance.

Solution to Problem

The capacitance detection device of the present disclosure includes a sensor unit including at least one sensor element whose capacitance changes, a control line applying to the sensor element a predetermined charging voltage for detecting the capacitance of the sensor element, a shield line electrically shielding the control line, a control circuit supplying the charging voltage to the sensor element via the control line, measuring a voltage change of the sensor element when the charging voltage is applied to the sensor element, and detecting the capacitance of the sensor element based on the voltage change, and an equipotential circuit setting a potential of the shield line equal to a potential of the control line.

Advantageous Effects of Invention

According to the present disclosure, the equipotential circuit can reduce an influence of charge accumulation on a parasitic capacitance due to the shield line. Therefore, a capacitance detection device capable of accurately measuring a change in capacitance can be provided.

DESCRIPTION OF EMBODIMENTS

Embodiments of a capacitance detection device of the present disclosure will be described in detail with reference to the drawings as appropriate.

First Embodiment

1. Configurations

Figure 1:
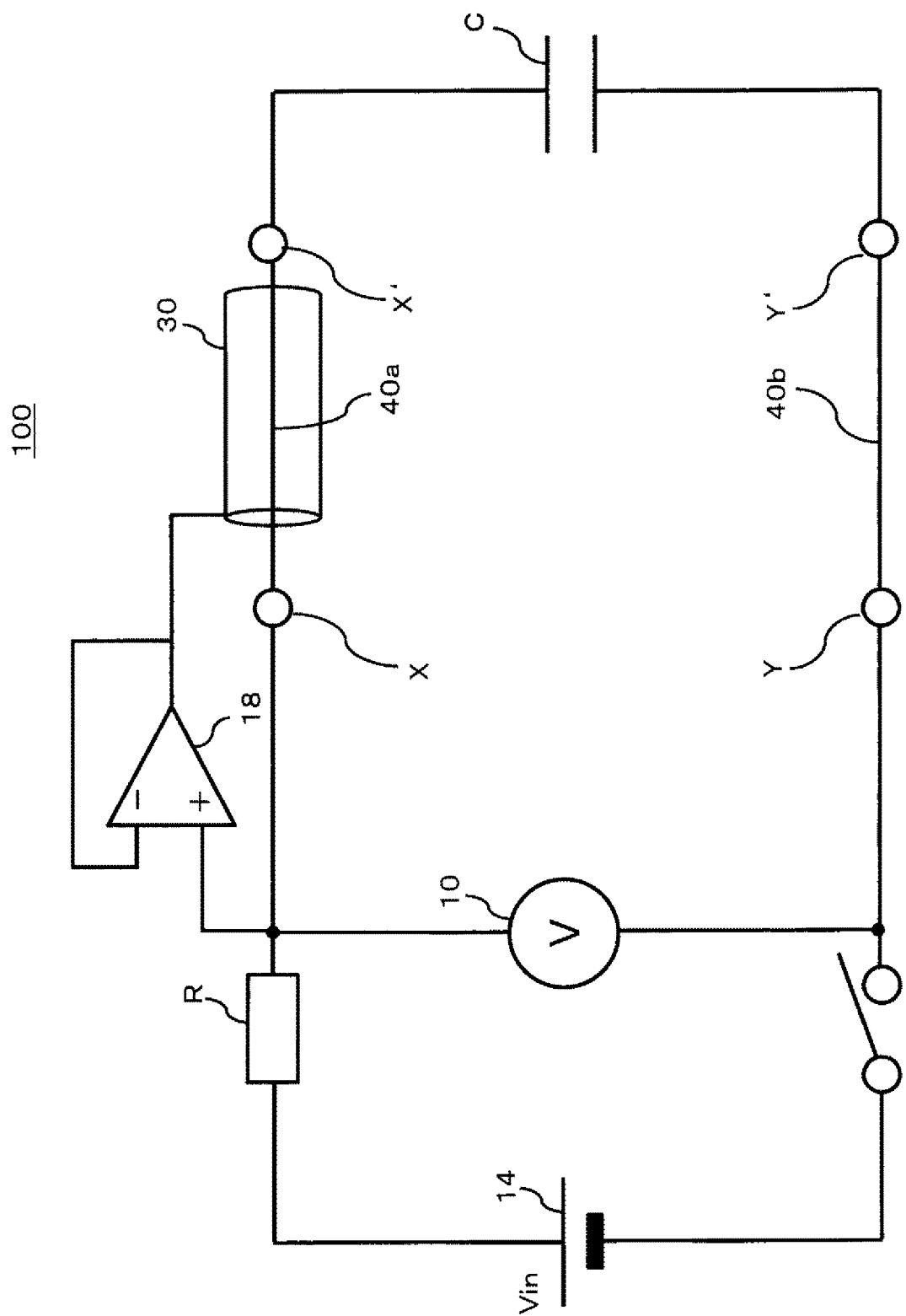
FIG. 1 is a diagram for describing a concept of a capacitance detection device of the present disclosure.

FIG. 1 is a diagram for describing a conceptual configuration of a capacitance detection device according to the present disclosure. A capacitance detection device 100 includes a sensor unit C including multiple sensor elements whose capacitances may change, a measurement circuit 10 measuring a capacitance of each sensor element in the sensor unit C, a power source 14 outputting a voltage Vin for capacitance measurement, and a resistor R.

The sensor unit C includes the multiple sensor elements each having a capacitance changed when touched or when a hand comes close and outputting a voltage corresponding to the capacitance. The measurement circuit 10 calculates the capacitance by measuring the voltage of each of the sensor elements in the sensor unit C.

The measurement circuit 10 and the sensor unit C are connected via respective terminals X, Y and X', Y', and via control lines 40a, 40b. Additionally, the control line 40a on the high voltage side is electrically shielded by a shield line 30. The shield line 30 is formed by arranging multiple covered conductive wires around the control wire 40a located at the center, for example. The configuration of the shield line 30, i.e., a shield means for the control line 40a, is not limited thereto. In this way, by shielding the control line 40a, influences of an external noise on the control line 40a can be reduced, and fluctuations of the voltage due to the noise can be reduced in the sensor elements of the sensor unit C measured by the measurement circuit 10.

Figure 2:
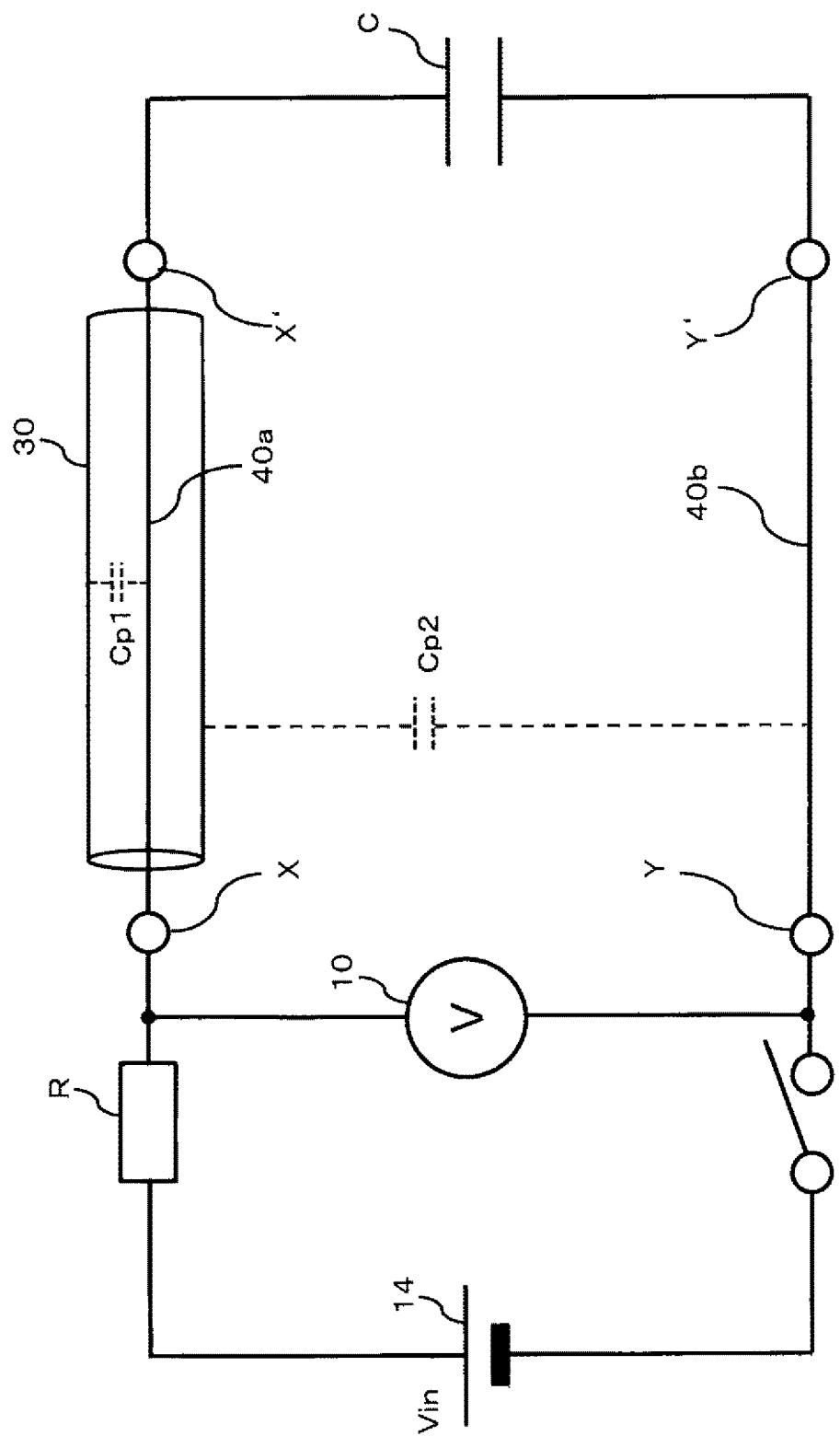
FIG. 2 is a diagram for demonstrating a parasitic capacitance that may be generated by a shield line.

When the shield line 30 as describe above is disposed, parasitic capacitances Cp1, Cp2 are generated between the control lines 40a, 40b and the shield line 30, as shown in FIG. 2. Due to the parasitic capacitances Cp1 and Cp2, a measured value may significantly be different from the capacitance value of the sensor element originally desired to be measured, and the measurement accuracy may be reduced.

To solve such a problem, as shown in FIG. 1, the capacitance detection device 100 further includes an equipotential circuit 18.

The equipotential circuit 18 comprises an OP amplifier having output fed back to a negative input terminal (−) and outputs a signal having a potential equal to that of a signal input to a positive input terminal (+). Since the OP amplifier of the equipotential circuit 18 is supplied with power from the outside, the equipotential circuit 18 outputs the signal having a potential equal to that of the signal input to the positive input terminal (+) without drawing a current from the positive input terminal (+). The equipotential circuit 18 controls the potential of the shield line 30 to be equal to the potential of the control line 40a, i.e., the potential applied to the sensor element subject to measurement in the sensor unit C. This eliminates influences of the parasitic capacitances Cp1 and CP2 due to the shield line 30 and improves the measurement accuracy of the capacitance of the sensor element.

Figure 3:
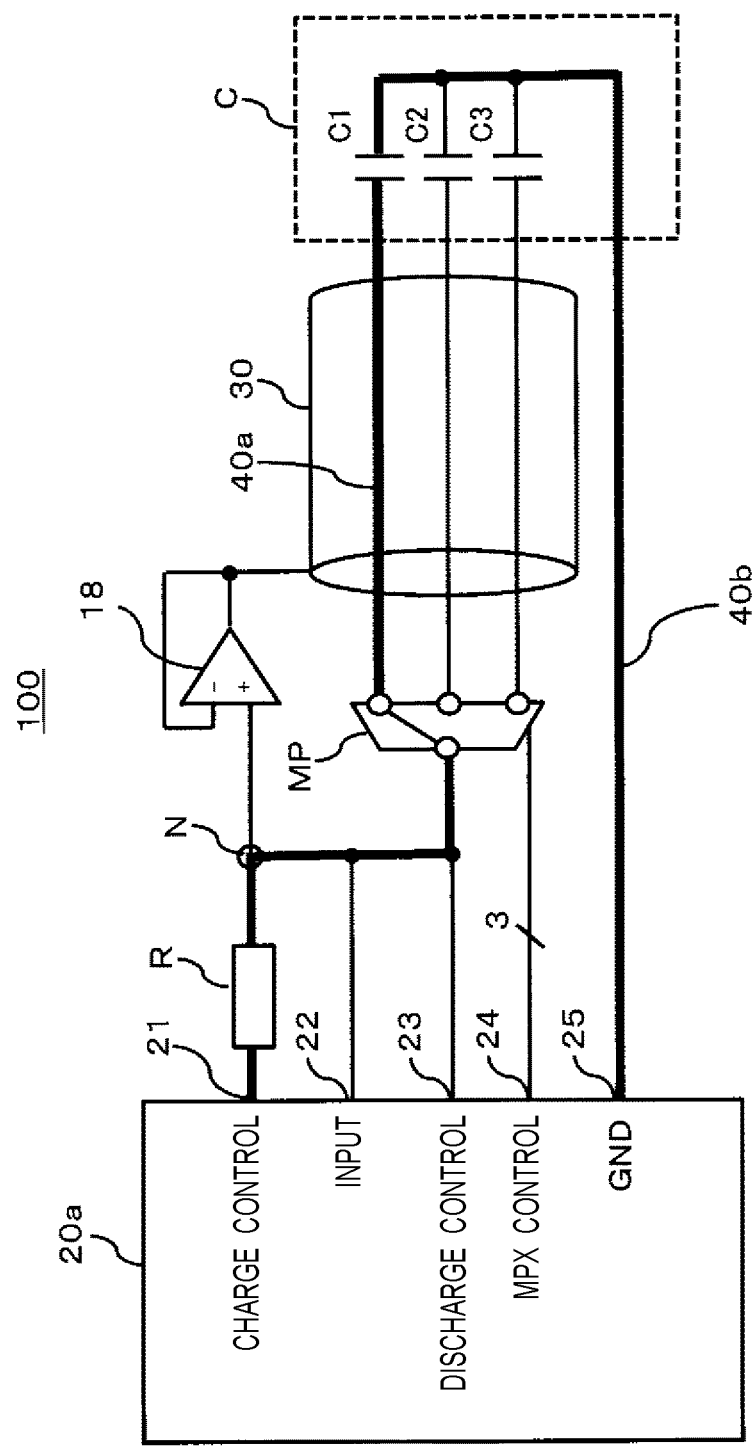
FIG. 3 is a diagram showing a configuration of a capacitance detection device according to a first embodiment of the present disclosure.

FIG. 3 is a diagram showing a more specific embodiment of the capacitance detection device 100. In FIG. 3, a microcontroller 20a is shown as a specific example of the measurement circuit 10 and the power source 14.

The sensor unit C includes three capacitive sensor elements C1 to C3 whose capacitances change and which are connected in parallel. The sensor elements C1 to C3 are capacitive tactile sensors. When the sensor elements C1 to C3 are touched or pushed, the capacitance values thereof change depending on a touched strength or a pressed strength. The sensor element may not necessarily be a tactile sensor, and any sensor such as a pressure sensor can be used as long as the sensor is a capacitive sensor.

Each of the control lines 40a is connected to each of the sensor elements C1 to C3. In the example of FIG. 3, the three control lines 40a are collectively shielded by the one shield line 30; however, a shield line may be disposed for each of the control lines 40a.

The capacitance detection device 100 includes a multiplexer MP for selecting any one of the sensor elements C1 to C3 as a subject of measurement.

The microcontroller 20a is a control circuit implementing a predetermined function in cooperation with software (program). The microcontroller 20a includes a charge control terminal 21, an input terminal. 22, a discharge control terminal 23, a multiplexer (MPX) control terminal 24, and a ground (GND) terminal 25.

The charge control terminal 21 is a terminal outputting a charging voltage for measuring the potentials of the sensor elements C1 to C3. The output (potential) of the charge control terminal 21 is controlled to "H" (High) or "L" (Low).

The input terminal 22 is a terminal inputting a measurement voltage (sensing voltage) of the sensor elements C1 to C3 subject to measurement. The microcontroller 20a includes an AD converter and converts the analog value of the sensing voltage input via the input terminal 22 into a digital value by the AD converter.

The discharge control terminal 23 is a terminal for discharging an electric charge accumulated in the sensor elements C1 to C3. The discharge control terminal 23 is controlled at a high impedance during the measurement of the capacitance. The discharge control terminal 23 is controlled to "L" when the sensor elements C1 to C3 are discharged.

The MPX control terminal 24 outputs a control signal for switching an input of the multiplexer MP. The MPX control terminal 24 outputs an MPX control 1 signal for controlling connection between the input of the multiplexer MP and the sensor element C1, an MPX control 2 signal for controlling connection between the input of the multiplexer MP and the sensor element C2, and an MPX control 3 signal for controlling connection between the input of the multiplexer MP and the sensor element C3.

The ground terminal 25 is a terminal for connecting to a ground potential.

Each of the sensor elements C1 to C3 has one end connected to the charge control terminal 21 of the microcontroller via the resistor R or the multiplexer MP, and the other end connected to the ground terminal 25 via the control line 40b. A node N between the sensor elements C1 to C3 and the resistor R is connected to the input terminal 22 and the discharge control terminal 23. At this node N, the voltage (sensing voltage) of the sensor elements C1 to C3 is measured. Therefore, the sensing voltage Vc is the voltage of the sensor element in an RC circuit made up of the resistor R and any of the sensor elements C1 to C3. At the time of discharging, the electric charge accumulated in the sensor elements C1 to C3 can be discharged by setting the node N to "L".

The multiplexer MP is inserted between the sensor elements C1 to C3 and the resistor R. The sensor elements C1 to C3 are connected to the input of the multiplexer MP via the control line 40a. The node N is connected to an output of the multiplexer MP. The multiplexer MP selects any of the sensor elements C1 to C3 in accordance with the control signal from the MPX control terminal 24 of the microcontroller 20a and connects the sensor element to the node N. As a result, the sensing voltage of one of the sensor elements C1 to C3 selected by the multiplexer MP can be detected or measured via the node N.

The positive input terminal (+) of the equipotential circuit 18 is connected to the node N, and the output thereof is connected to the shield line 30 (conductor portion). As a result, the potential of the shield line 30 can be controlled to be equal to the potential of the node N, i.e., the potential of the control line 40a.

2. Operations

An operation of the capacitance detection device 100 configured as above will hereinafter be described.

Figure 4:
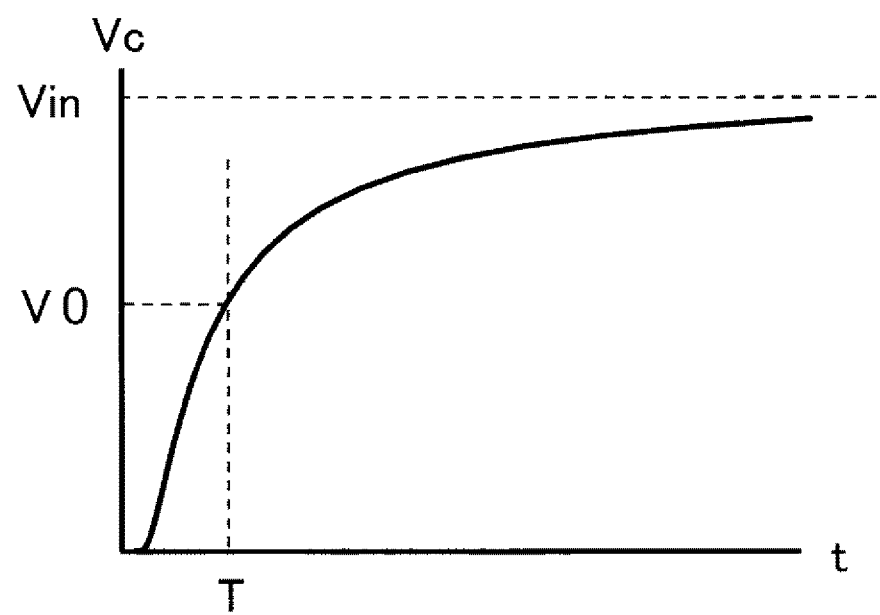
FIG. 4 is a diagram for demonstrating a time change of a sensing voltage Vc measured from a sensor element.

In the capacitance detection device 100, the microcontroller 20a measures a capacitance of each of the sensor elements C1 to C3 of the sensor unit C based on the sensing voltage Vc of each of the sensor elements C1 to C3. Specifically, the microcontroller 20a supplies a predetermined charging voltage Vin from the charge control terminal 21 to one of the sensor elements C1 to C3 subject to measurement. The microcontroller 20a measures the voltage (sensing voltage Vc) of the sensor elements C1 to C3 subject to measurement via the input terminal 22. In this case, the sensing voltage Vc is obtained by the following equation:

[Math. 1]

$$Vc = \text{Vin}\left\{1 - \exp\left(-\frac{t}{RC}\right)\right\} \quad (1)$$

where R denotes a resistance value of the resistor R, C denotes a capacitance of the sensor subject to measurement, t denotes a charging time, and Vin denotes a value of the charging voltage. FIG. 4 is a diagram showing a time change of the sensing voltage Vc according to Eq. (1). The microcontroller 20a measures a time t until the sensing voltage Vc reaches a predetermined voltage value V0. The microcontroller 20a obtains the capacitance C from the measured time t in accordance with Eq. (1).

Figure 5:
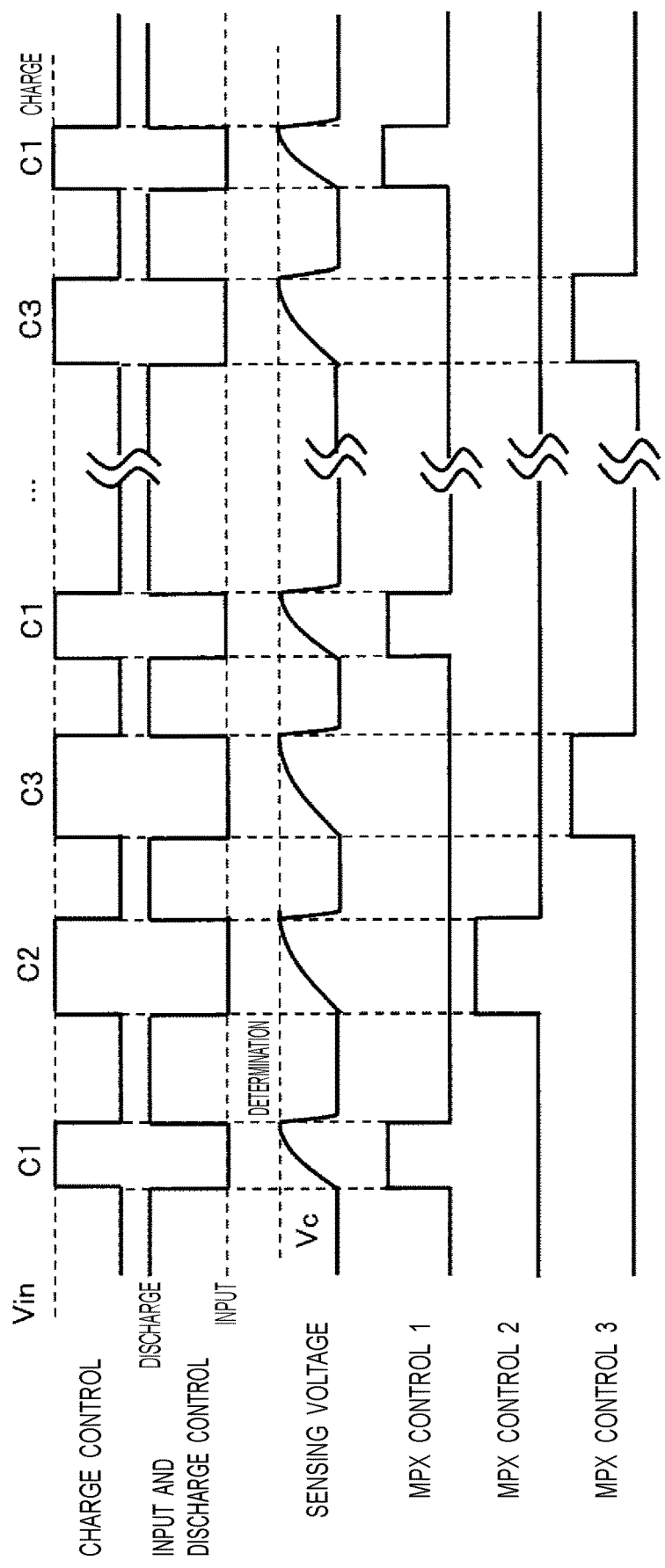
FIG. 5 is a timing chart of the capacitance detection device (when a time measurement method is adopted).

FIG. 5 is a timing chart of the capacitance detection device 100. The operation of the capacitance detection device 100 will hereinafter be described with reference to FIG. 5.

First, the input terminal 22 and the discharge control terminal 23 are put into a discharge state (each to "L"), and the electric charge accumulated in a sensor element which was previously subject to measurement (the sensor element C3 in the example of FIG. 5) is discharged.

The discharge control terminal 23 is set to a high impedance to enter a measurement voltage input state and voltage measurement is started at the input terminal 22. In this case, the multiplexer MP selects one sensor element subject to measurement from the sensor elements C1 to C3 in accordance with the control signal from the MPX control terminal 24 and connects the control line 40a of the selected sensor element C1, C2 or C3 to the node N. In the example of FIG. 5, the sensor element C1 is selected.

As a result, the selected sensor element C1 is charged with the charging voltage Vin from the charge control terminal 21. The microcontroller 20a acquires the sensing voltage Vc of the sensor element C1 via the input terminal 22, measures the time t=T from the start of charging until the sensing voltage Vc reaches the predetermined voltage value V0, and obtains the capacitance C of the sensor element C1 based on the time t=T.

During this measurement, the equipotential circuit 18 controls the potential of the shield line 30 to be the same as the potential of the node N (potential of the control line 40a). As a result, no electric charge is accumulated in the parasitic capacitance Cp1 between the shield line 30 and the control line 40a, so that an unnecessary capacitance between the control line 40a and the shield line 30 can be prevented from being measured. The electric charge accumulated in the parasitic capacitance Cp2 between the shield line 30 and the control line 40b (to ground) is not charged via the resistor R and is supplied from a power source of the equipotential circuit 18. Therefore, no influence is exerted on the calculation of the capacitance for the RC circuit made up of the resistor R and the sensor elements C1 to C3. In this way, at the time of measurement of the sensor elements C1 to C3, the influence of the electric charges accumulated in the parasitic capacitances of the control lines 40a, 40b and the shield line 30 can be reduced.

When the measurement is completed, the microcontroller 20a sets the input terminal 22 and the discharge control terminal 23 to "L" to discharge the electric charge accumulated in the sensor element C1 subject to measurement.

The input terminal 22 and the discharge control terminal 23 are then put into an input state, the multiplexer MP switches to the next sensor element C2, and the charging with the voltage Vin from the charge control terminal 21 can be performed to measure the capacitance of the next sensor element C2. Subsequently, the sensor elements C1 to C3 subject to measurement are sequentially switched in the same way to measure the capacitance of each of the sensor elements.

Figure 6:
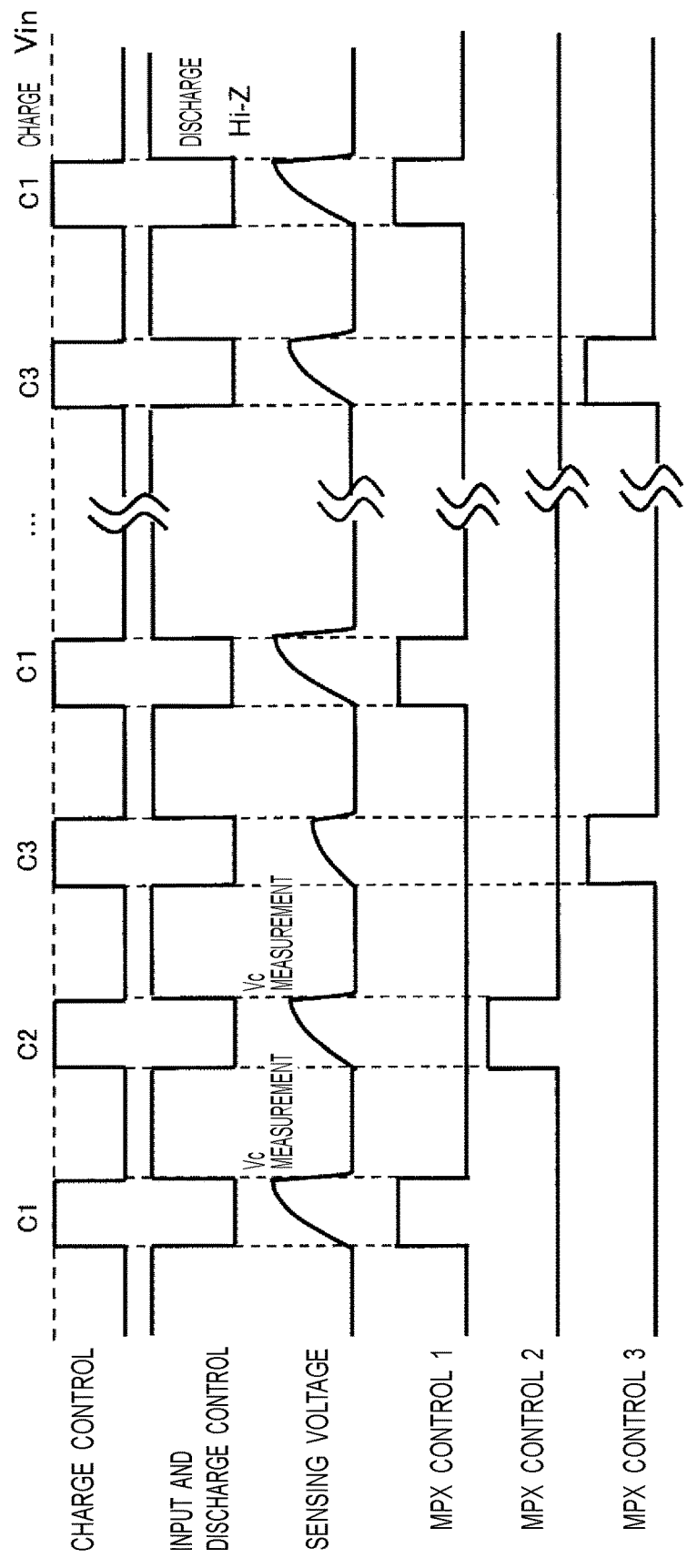
FIG. 6 is a timing chart of the capacitance detection device when a voltage measurement method is adopted.

In the control described above, when the capacitance of the sensor elements C1 to C3 subject to measurement is obtained, the time t=T until the sensing voltage Vc reaches a constant voltage V0 is measured, and the capacitance of the sensor element is obtained by using the time t=T based on Eq. 1 in the example. A method of measuring the time t of the sensing voltage Vc reaching the constant voltage V0 and obtaining the capacitance C based on the time t is hereinafter referred to as a "time measurement method". On the other hand, by measuring the sensing voltage Vc when the sensor elements C1 to C3 are charged for a certain time t0, the capacitance C can be obtained from Eq. (1) based on the measured voltage Vc. In this case, the microcontroller 20a includes a timer therein and measures the certain time (t0) with this timer. A method of obtaining the capacitance C from Eq. (1) based on the measured voltage Vc is referred to as a "voltage measurement method". The microcontroller 20a may calculate the capacitance by this voltage measurement method instead of the time measurement method. FIG. 6 shows a timing chart when the capacitance is obtained by the voltage measurement method. In the case of the time measurement method, as shown in FIG. 5, the amplitude of the sensing voltage Vc is constant, and the width thereof varies in accordance with the capacitance of the sensor element. On the other hand, in the case of the voltage measurement method, as shown in FIG. 6, although the width of the sensing voltage Vc is substantially constant, the amplitude of the sensing voltage Vc varies in accordance with the capacitance of the sensor element.

The microcontroller 20a may use the time measurement method and the voltage measurement method together. Specifically, when the potentials of the sensor elements C1 to C3 are measured by the voltage measurement method, if the capacitance is small, the method has a problem that an error of a value of the capacitance obtained from Eq. (1) becomes large. On the other hand, the time measurement method has a problem that although a linear value can be measured at a small capacitance, the measurement takes time when the capacitance is large.

Figure 7:
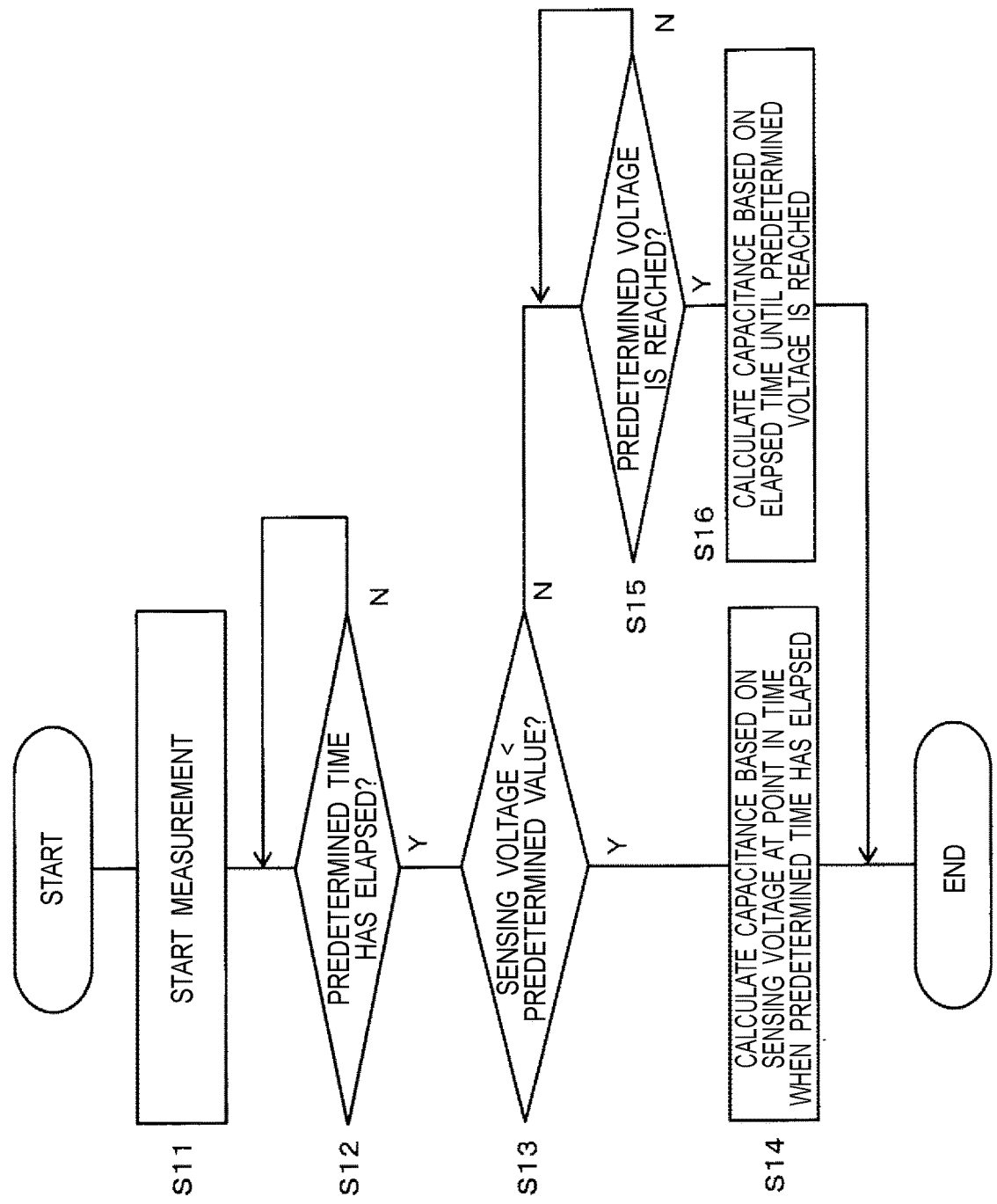
FIG. 7 is a flowchart showing a capacity measurement process in a microcontroller when the time measurement method and the voltage measurement method are used together.

Therefore, the time measurement method and the voltage measurement method may be used together. For example, when the measurement time is prioritized, firstly, the sensing voltage Vc after the elapse of a certain time is measured by the voltage measurement method, and as a result, when the sensing voltage Vc is small (i.e., when the capacitance is large), the result (measurement result of the voltage measurement method) is adopted. On the other hand, when the sensing voltage Vc is large (i.e., when the capacitance is small), the measurement result of the time measurement method is adopted. FIG. 7 shows a flowchart in this case.

In FIG. 7, the microcontroller 20a starts measuring the sensing voltage Vc of the sensor elements C1 to C3 (S11). After the elapse of a predetermined time (t0) (S12), the sensing voltage Vc is compared with a predetermined value (S13). If the sensing voltage Vc is smaller than the predetermined value (YES at S13), the capacitance is calculated based on the sensing voltage Vc measured at point in time when the predetermined time (t0) has elapsed (S14). On the other hand, if the sensing voltage Vc is equal to or greater than the predetermined value (NO at S13), the measurement is continued until the sensing voltage Vc reaches a predetermined voltage (V0) (S15). The capacitance is calculated based on the elapsed time until the sensing voltage Vc reaches the predetermined voltage (V0) (S16).

Figure 8:
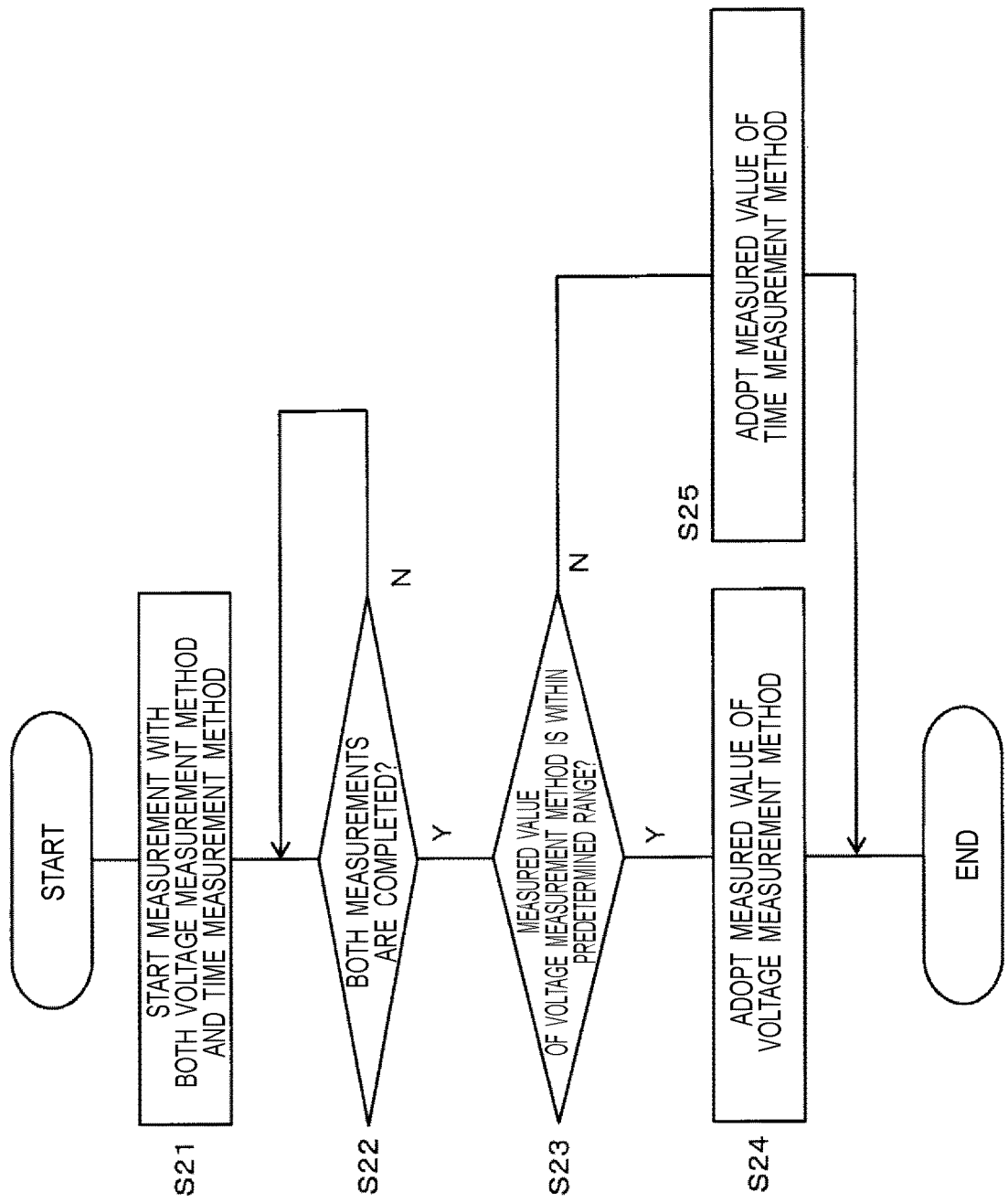
FIG. 8 is a flowchart showing another example of the capacity measurement process in the microcontroller when the time measurement method and the voltage measurement method are used together.

When measurement accuracy is prioritized, for example, measurement is performed with both the time measurement method and the voltage measurement method, and if the result of the voltage measurement method is within a range of good accuracy, the result of the voltage measurement method may be adopted. FIG. 8 shows a flowchart in this case.

The microcontroller 20a measures the sensing voltage Vc with both the voltage measurement method and the time measurement method (S21). When the measurement is completed with both methods (S22), the microcontroller 20a determines whether the measured value of capacitance calculated based on the measurement result (measured voltage) of the voltage measurement method is within a predetermined range in which an accurate result is obtained (S23). If the measured value of capacitance is a value within a predetermined range in which an accurate result is obtained (YES at S23), the measured value of capacitance from the voltage measurement method is adopted. On the other hand, if the measured value of capacitance is not within the predetermined range in which an accurate result is obtained (NO at S23), the measured value of capacitance from the time measurement method is adopted (S25).

3. Effects Etc.

As described above, the capacitance detection device 100 of this embodiment includes the sensor unit C including the sensor elements C1 to C3 whose capacitances change, the control line 40a applying a predetermined charging voltage for detecting the capacitance of the sensor elements C1 to C3 to the sensor elements C1 to C3, a shield line 30 electrically shielding the control line, the microcontroller 20a supplying a charging voltage to the sensor elements C1 to C3 via the control line 40a and measuring a voltage change of the sensor elements C1 to C3 when the charging voltage is applied to the sensor elements C1 to C3 to detect the capacitance of the sensor elements C1 to C3 based on the voltage change, and the equipotential circuit 18 setting the potential of the shield line 30 to a potential equal to the potential of the control line 40a.

According to the configuration, since the shield line 30 is set to the same potential as the control line 40a by the equipotential circuit 18, the influence of charge accumulation on the parasitic capacitances Cp1 and Cp2 generated due to the shield line 30 can be reduced. As a result, the capacitance detection device capable of accurately measuring a change in capacitance can be provided.

Second Embodiment

In the configuration of the first embodiment, the capacitance (C) in the RC circuit is measured by measuring the potential of the capacitive sensor element; however, depending on an AD converter etc. built in the microcontroller 20a, electric charges accumulated in the sensor elements C1 to C3 is extracted and measured at the time of measurement of the potentials of the sensor elements. If the electric charges are extracted, the potentials of the sensor elements C1 to C3 decrease, which causes a problem that correct measurement cannot be performed.

Therefore, in this embodiment, instead of directly measuring the potentials of the sensor elements C1 to C3, a potential generated via an equipotential circuit is measured.

Figure 9:
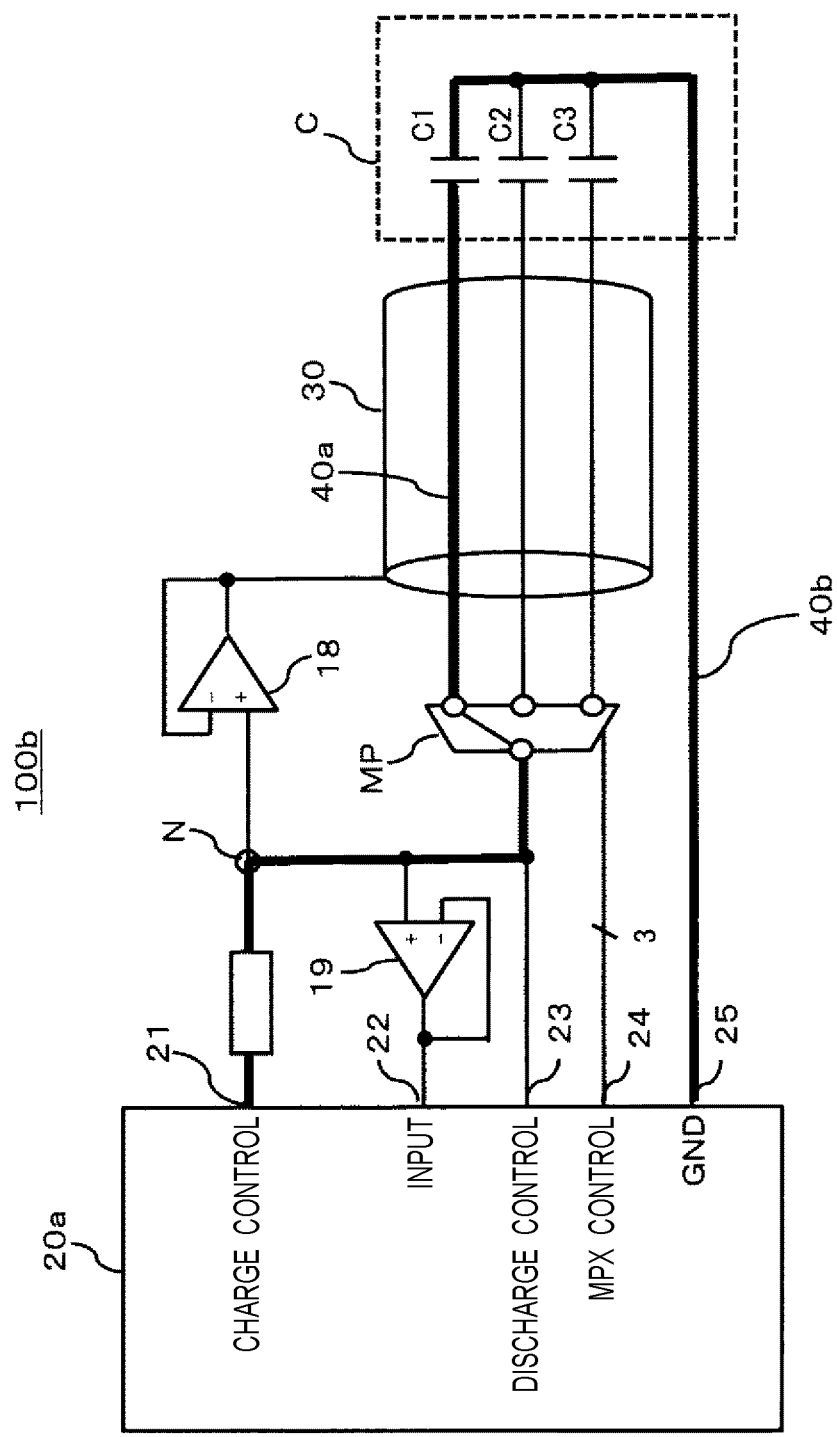
FIG. 9 is a diagram showing a configuration of a capacitance detection device according to a second embodiment of the present disclosure.

FIG. 9 is a diagram showing a configuration of the capacitance detection device 100b according to a second embodiment of the present disclosure. As shown in FIG. 9, the capacitance detection device 100b of this embodiment further includes a second equipotential circuit 19 between the node N and the input terminal 22 in addition to the configuration of the first embodiment.

The second equipotential circuit 19 has the same configuration as the equipotential circuit 18 (first equipotential circuit) and outputs a potential equal to the potential input to the positive input terminal. The second equipotential circuit 19 has a positive input terminal connected to the node N and an output connected to the input terminal 22. With this configuration, the sensing voltage is input via the second equipotential circuit 19 to the input terminal 22 of the microcontroller 20a. In this case, even if the electric charge is extracted by an AD converter etc., the electric charge is replenished from the second equipotential circuit 19, so that the potentials of the sensor elements C1 to C3 can be prevented from decreasing.

Third Embodiment

Depending on a capacitance value desired to be measured in the sensor elements C1 to C3, a voltage required for charging the sensor elements changes, and a measurement accuracy and a measurement time change. If the capacitance values of the sensor elements C1 to C3 are large, the charging/measurement time is elongated so as to provide sufficient accuracy.

Therefore, in this embodiment, the microcontroller 20a is provided with multiple charge control terminals to which resistors having different resistance values are connected, and the charge control terminals, i.e., the resistance values, can be switched depending on a capacitance value desired to be measured.

Figure 10:
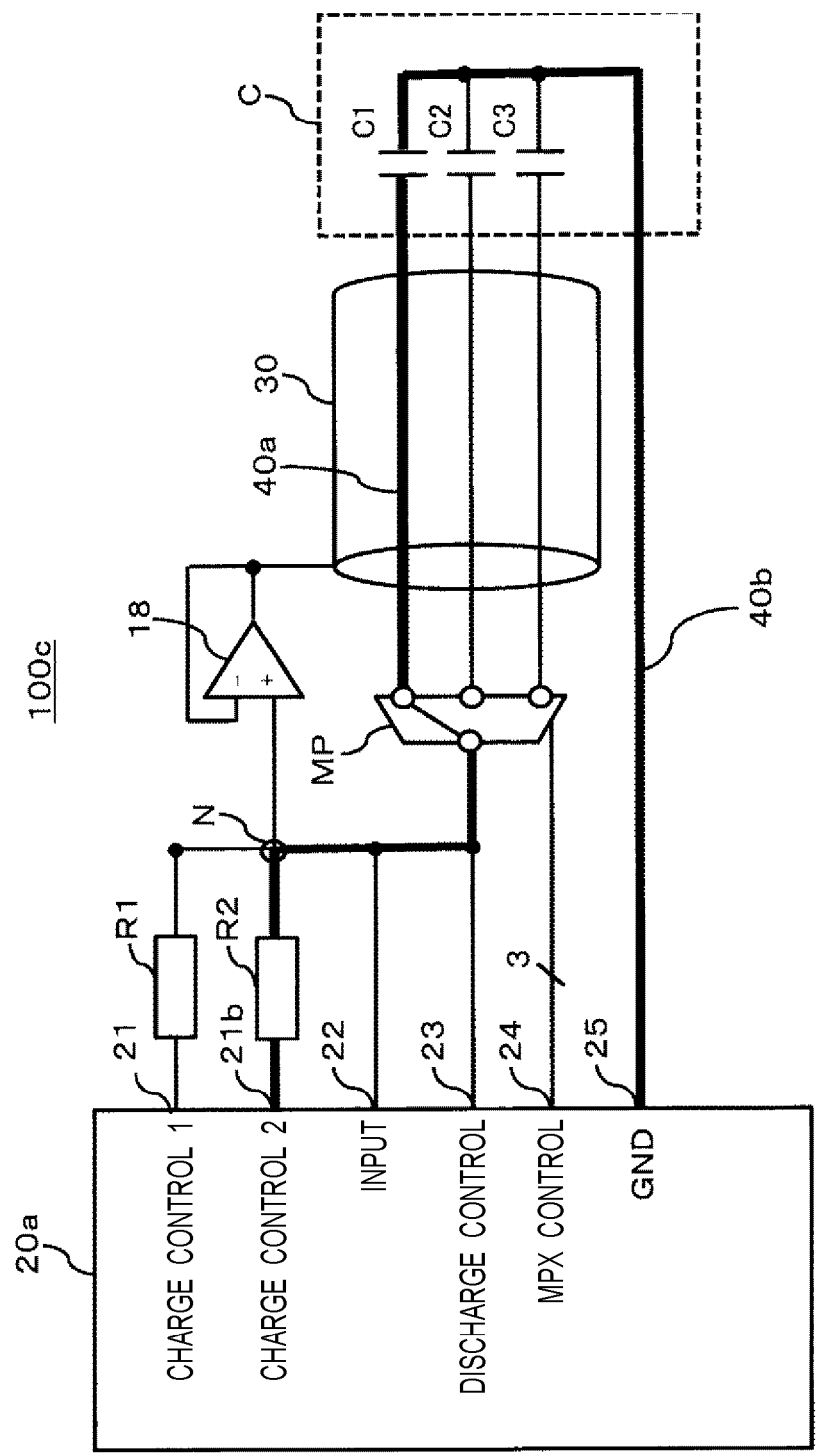
FIG. 10 is a diagram showing a configuration of a capacitance detection device according to a third embodiment of the present disclosure.

FIG. 10 is a diagram showing a configuration of a capacitance detection device according to a third embodiment of the present disclosure. As shown in FIG. 10, in a capacitance detection device 100c of this embodiment, the microcontroller 20a includes two charge control terminals 21, 21b. A resistor R1 is connected to the charge control terminal 21, and a resistor R2 having a resistance value different from the resistor R1 is connected to the charge control terminal 21b.

For example, in the time measurement method, a sensor element is charged through a resistor to check the potential thereof, and in this case, the measurement accuracy can further be improved by changing a resistance value depending on a magnitude of the capacitance value. For example, the resistance value may be switched as follows.

When the capacitance is small: the resistance value is made larger. As a result, although the measurement time becomes longer, the time resolution can be increased.

When the capacitance is large: the resistance value is made smaller. As a result, the measurement time can be shortened.

As described above, by preparing multiple charge control terminals to which different resistors are connected, an optimum resistance value can be selected for measurement depending on a situation.

Alternatively, after the measurement is first performed at a high speed with a low resistance value, a sensor element having a change from the previous measurement can accurately be measured with a high resistance value.

Fourth Embodiment

In the embodiments described above, the sensor unit C having the configuration including the three sensor elements C1 to C3 connected in parallel has been described as an example. However, the ideas of the embodiments are not limited to such a configuration of the sensor unit C and can be applied to the sensor unit C having another configuration. For example, the ideas can be applied to a sensor unit in which multiple sensor elements are two-dimensionally arranged.

Figure 11:
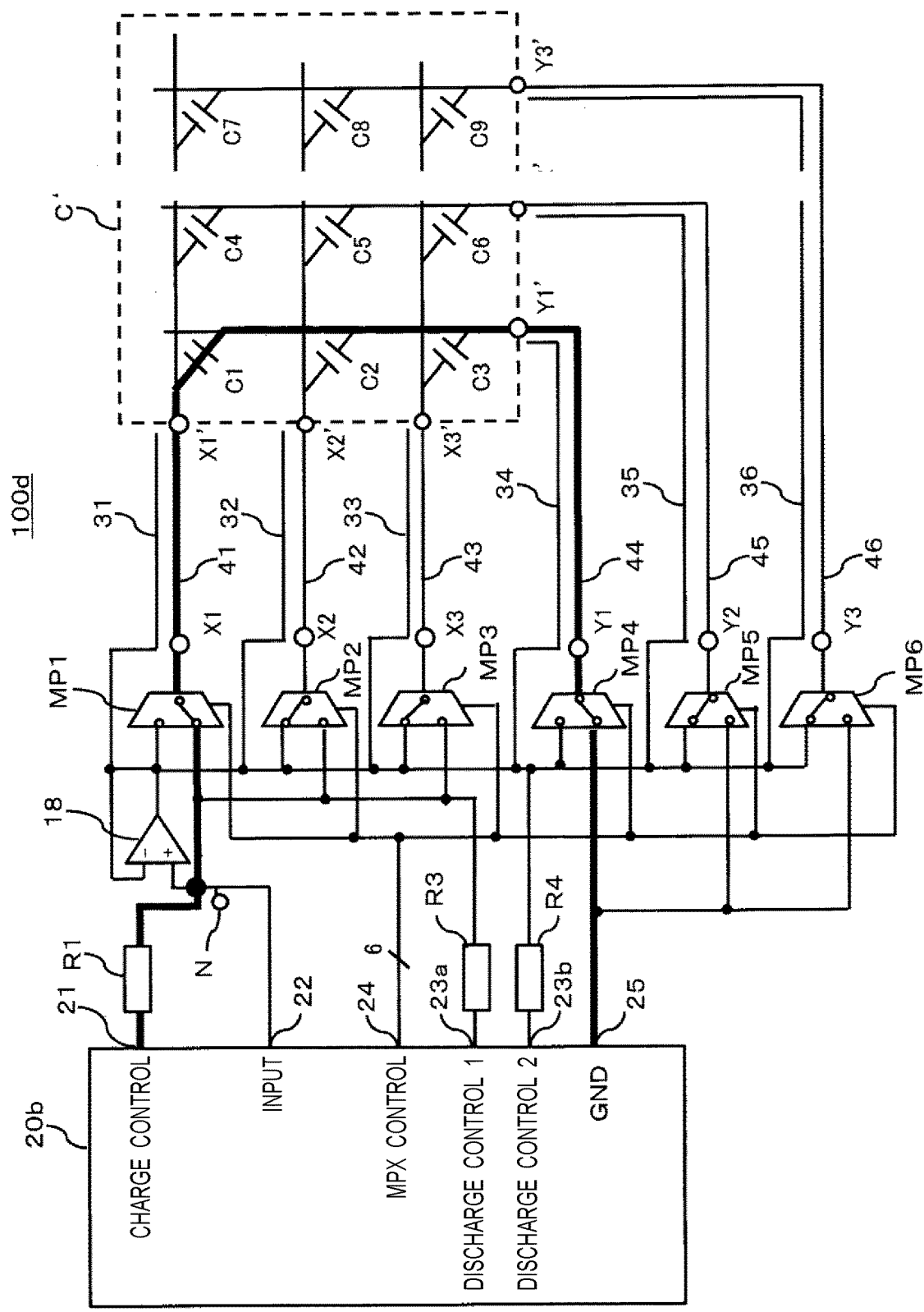
FIG. 11 is a diagram showing a configuration of a capacitance detection device according to a fourth embodiment of the present disclosure.

FIG. 11 is a diagram showing a configuration of a capacitance detection device 100d when the configuration of the first embodiment is applied to a sensor unit in which multiple sensor elements are two-dimensionally arranged.

The capacitance detection device 100d includes a sensor unit C' including multiple sensor elements C1 to C9 whose capacitances change, and a microcontroller 20b calculating the capacitance of the sensor elements C1 to C9 of the sensor unit C', multiplexers MP1 to MP6, and the equipotential circuit 18.

The sensor unit C' includes sensor elements C1 to C9 arranged in a matrix shape of 3 rows×3 columns. Although the configuration of the sensor elements arranged in 3 rows×3 columns is described with reference to FIG. 11 for convenience of description, the number of sensor elements in the sensor unit C' is not limited thereto, and the sensor elements may be arranged in M rows×N columns (M and N are any positive integers).

One input of each of the multiplexers MP1 to MP3 is connected to the output of the equipotential circuit 18. The other inputs of the multiplexers MP1 to MP3 are connected to the charge control terminal 21 via the resistor R1. The other inputs of the multiplexers MP1 to MP3 are also connected to the input terminal 22 and a discharge control 1 terminal 23a via a resistor R3. The outputs of the multiplexers MP1 to MP3 are connected to row control lines 41 to 43, respectively.

One input of each of the multiplexers MP4 to MP6 is connected to the ground terminal 25. The other inputs of the multiplexers MP4 to MP6 are connected to the output of the equipotential circuit 18. The other inputs of the multiplexers MP4 to MP6 are also connected to a discharge control 2 terminal 23b via a resistor R4. The outputs of the multiplexers MP4 to MP6 are connected to column control lines 44 to 46, respectively.

The MPX control terminal 24 of the microcontroller 20b outputs a control signal for controlling switching of the respective inputs of the multiplexers MP1 to MP3, MP4 to MP6.

The capacitance detection device 100d also includes shield lines 31 to 33 and shield lines 34 to 36 shielding the row control lines 41 to 43 and the column control lines 44 to 46, respectively.

In the equipotential circuit 18, the positive input terminal (+) is connected to the node N, and the output is connected to the shield lines 31 to 36. As a result, the potentials of the shield lines 31 to 36 can be controlled to be equal to the potential of the node N, i.e., the potentials of the row control lines 41 to 43 and the column control lines 44 to 46, respectively.

In the capacitance detection device 100d configured as described above, the multiplexers MP1 to MP6 are controlled such that the charge control terminal 21 is connected to the row control line of the sensor element subject to measurement and that to the ground terminal 25 is connected to the column control line. At the same time, the multiplexers MP1 to MP6 are controlled such that the output of the equipotential circuit 18 is connected to the row control lines and the column control lines other than the row control line and the column control line connected to the sensor element subject to measurement.

For example, when the sensor element C1 is a subject of measurement, the multiplexers MP1, MP4 are controlled such that the row control line 41 of the sensor element C1 is connected to the charge control terminal 21 and the ground terminal 25 is connected to the column control line 44. At the same time, the multiplexers MP2, MP3, MP5 and MP6 are controlled such that the output of the equipotential circuit 18 is connected to the row control lines 42, 43 and the column control lines 45, 46 other than the row control line 41 and the column control line 44 connected to the sensor element C1 subject to measurement.

Figure 12:
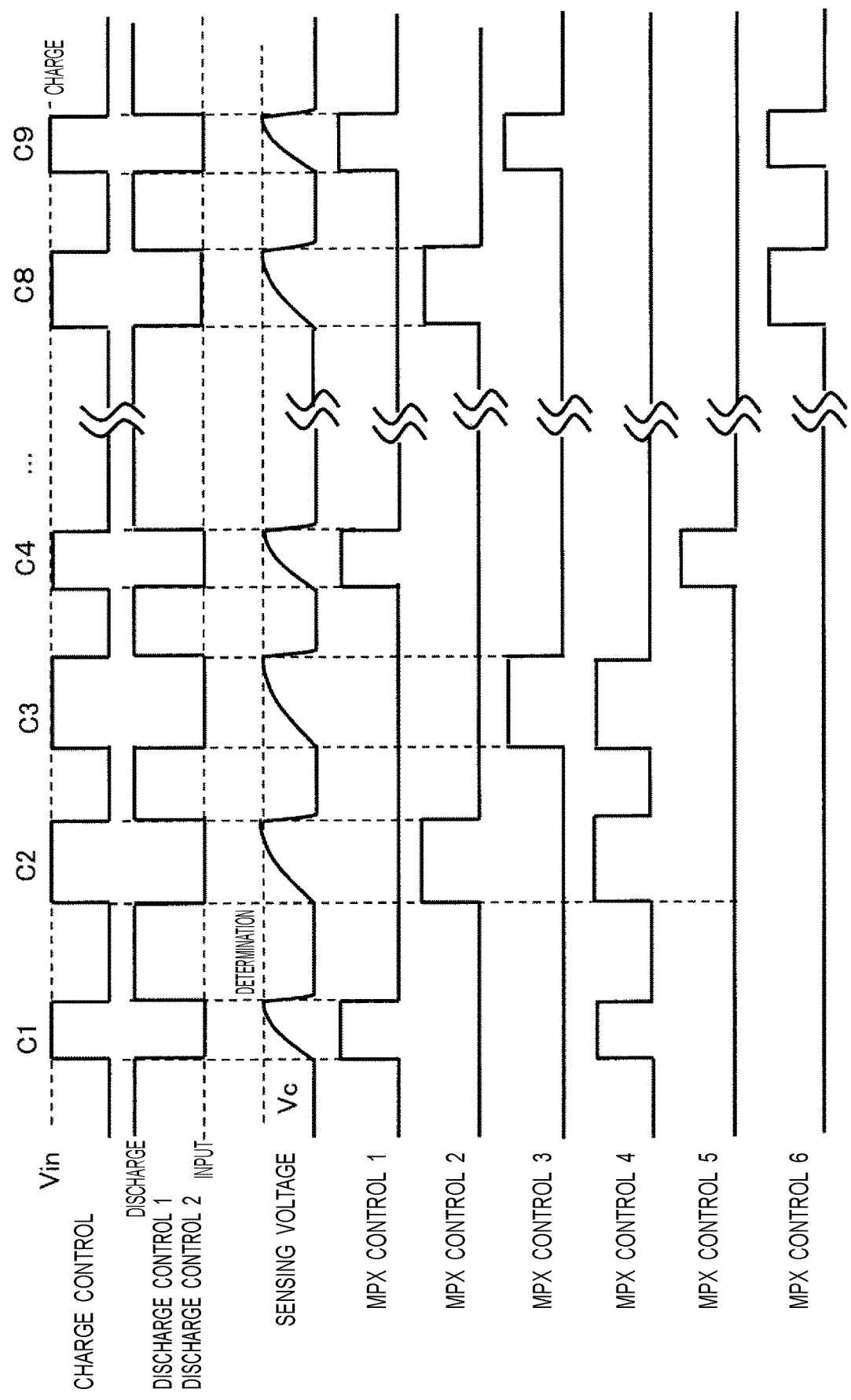
FIG. 12 is a timing chart of the capacitance detection device according to the fourth embodiment.

FIG. 12 is a timing chart of the capacitance detection device 100d according to the fourth embodiment. The sensor elements are measured in the order of C1, C2, C3, . . . , and C9.

For example, first, the input terminal 22 and the discharge control terminals 23a, 23b are put into the discharge state and discharged. The input terminal 22 and the discharge control terminals 23a, 23b are put into the measurement voltage input state, and the multiplexer MP1 is controlled to connect the row control line 41 to the charge control terminal 1, while the multiplexer MP4 is controlled to connect the column control line 44 to the ground terminal 25. As a result, the sensor element C1 is charged from the charge control terminal 1. In this case, the equipotential circuit 18 sets the potentials of the shield lines 31 to 36 to be the same as the potential of the control line 41. As a result, no electric charge is accumulated between the shield lines 31 to 36 and the control line 41, so that an unnecessary capacitance between the control line 41 and the shield line 31 can be prevented from being measured. The electric charge accumulated between the shield lines 31 to 36 and the ground is not charged through the resistor R1 and is supplied from the power source of the equipotential circuit 18, and therefore, no influence is exerted on the calculation of the capacitance in the RC circuit.

As described above, in the capacitance detection device 100d including the sensor unit C' in which the sensor elements C1 to C9 are arranged like a matrix, the problem of deterioration of measurement accuracy due to charge accumulation in the parasitic capacitances of the shield lines 31 to 36 can be solved by setting the shield lines 31 to 36 to the potential equal to that of the control lines 41 to 46 as in the first embodiment.

Fifth Embodiment

Figure 13:
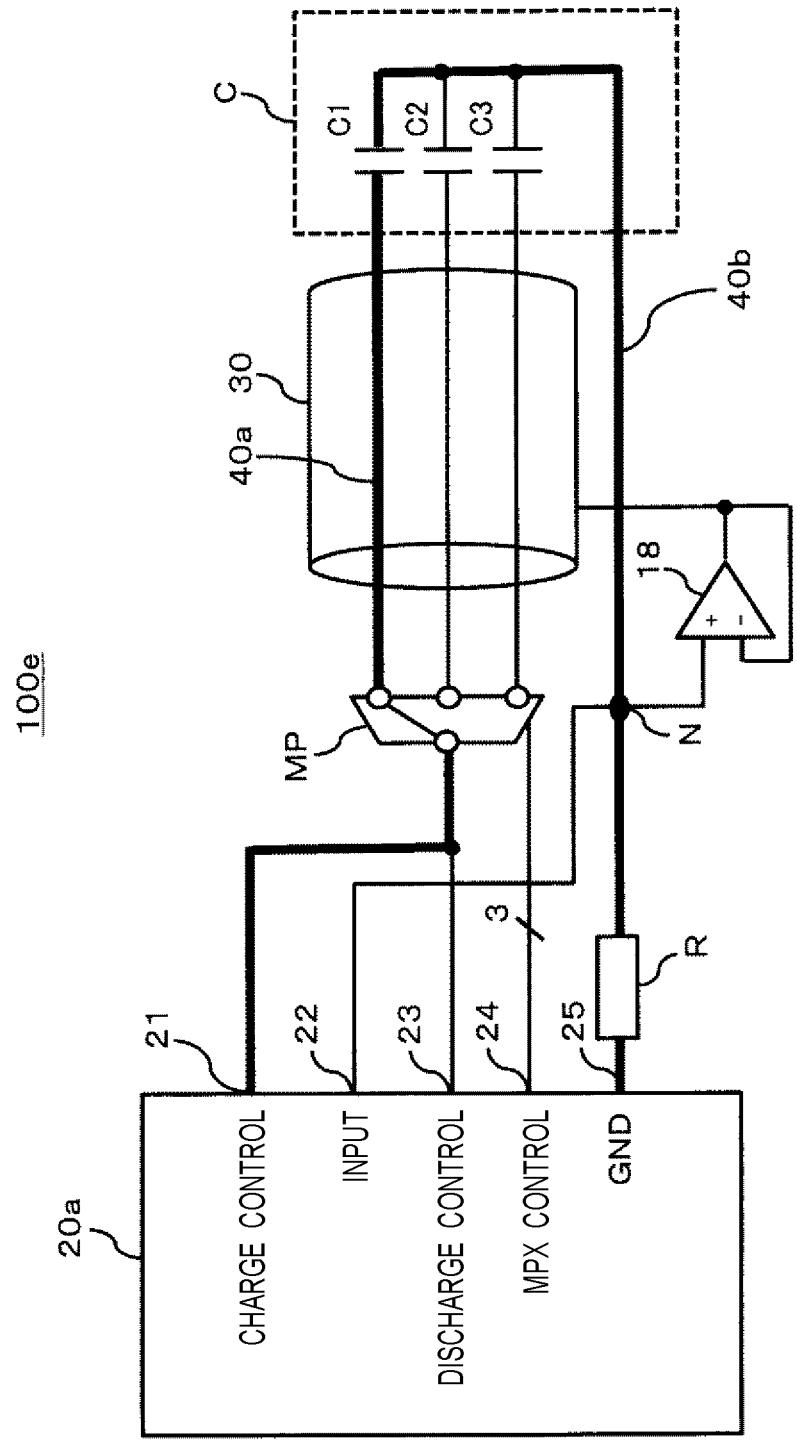
FIG. 13 is a diagram showing a configuration of a capacitance detection device according to a fifth embodiment of the present disclosure.

FIG. 13 is a diagram showing a configuration of a capacitance detection device 100e according to a fifth embodiment. In the embodiments described above, the resistor R is connected to the charge control terminal 21 side; however, the resistor R may not be on the charge control terminal 21 side. As shown in FIG. 13, the resistor R may be connected to the ground terminal (GND) 25 side. The node N is formed between the resistor R and the multiplexer MP and is connected to the input terminal 22 to measure the voltage of the sensor elements C1 to C3. The node N is connected to the positive input terminal (+) of the equipotential circuit 18, and a potential equal to that of the node N is generated and applied to the shield line 30. By using this circuit and performing the same control as in the embodiments described above, the capacitance C can be obtained according to Eq. (1).

Other Embodiments

As described above, the first to fifth embodiments have been described as exemplification of the techniques disclosed in the present application. However, the techniques in the present disclosure are not limited thereto and are also applicable to embodiments with modifications, replacements, additions, omissions, etc. made as appropriate. Additionally, the constituent elements described in the first to fifth embodiments can be combined to provide a new embodiment.

In the examples described in the embodiments, the microcontrollers 20a, 20b calculate the capacitance of the sensor element based on the sensing voltage Vc of the sensor element; however, a device (or circuitry) other than the microcontrollers 20a, 20b may calculate the capacitance based on the sensing voltage Vc.

Although the microcontrollers 20a, 20b are exemplified as the control circuit, the control circuit is not limited to the microcontroller and may be implemented by other types of devices. The function of the control circuit may be implemented through cooperation between hardware and software or may be implemented only by specially designed hardware. Therefore, the control circuit can be implemented by various processors such as a microcontroller, CPU, MPU, GPU, FPGA, DSP, and ASIC.

The embodiments have been described as exemplification of the techniques in the present disclosure. The accompanying drawings and the detailed description have been provided for this purpose.

Therefore, the constituent elements described in the accompanying drawings and the detailed description may include not only the constituent elements essential for solving the problem but also constituent elements not essential for solving the problem so as to illustrate the techniques. Thus, even though these non-essential constituent elements are included in the accompanying drawings and the detailed description, these non-essential constituent elements should not immediately be recognized as being essential.

Since the embodiments described above are intended to illustrate the techniques in the present disclosure, various modifications, replacements, additions, omissions, etc. can be made within the claims and the scope equivalent thereto.

INDUSTRIAL APPLICABILITY

The present disclosure is applicable to a capacitance detection device including a capacitive sensor.

The invention claimed is:

1. A capacitance detection device comprising:
   a sensor unit including at least one sensor element whose capacitance changes;
   a control line applying to the sensor element a predetermined charging voltage for detecting the capacitance of the sensor element;
   a shield line electrically shielding the control line;
   a control circuit supplying the charging voltage to the sensor element via the control line, measuring a voltage change of the sensor element when the charging voltage is applied to the sensor element, and detecting the capacitance of the sensor element based on the voltage change;
   an equipotential circuit being connected to the control line and setting a potential of the shield line equal to a potential of the control line, and
   a second equipotential circuit including an input terminal and an output terminal, generating a signal having the same potential as a signal input from the input terminal, and outputting the signal from the output terminal without drawing a current from the input terminal, wherein
   the control circuit includes a voltage input terminal for inputting a voltage of the sensor element,
   the input terminal of the second equipotential circuit is connected to the control line, and
   the second equipotential circuit generates a signal having a potential equal to the potential of the control line, and outputs the signal to the voltage input terminal.

2. The capacitance detection device according to claim 1, wherein the control circuit measures, as a voltage change of the sensor element, a voltage of the sensor element when the charging voltage is supplied to the sensor element for a predetermined time, and/or a time from a start of charging of the sensor element until a voltage of the sensor element reaches a predetermined voltage.

3. The capacitance detection device according to claim 1, wherein the control circuit includes a plurality of charge control terminals that supply charging voltages to the control line and that are connected to resistors having resistance values different from each other.

4. The capacitance detection device according to claim 1, wherein the sensor unit includes a plurality of sensor elements.

5. The capacitance detection device according to claim 4, wherein the plurality of sensor elements are two-dimensionally arranged.

* * * * *